US005297911A

United States Patent [19]

Powell

[11] Patent Number: 5,297,911

[45] Date of Patent: Mar. 29, 1994

[54] METHOD AND APPARATUS FOR HANDLING WASTE

[75] Inventor: Jay W. Powell, Chesterfield, Va.

[73] Assignee: Chambers Development Co., Inc., Pittsburgh, Pa.

[21] Appl. No.: 842,438

[22] Filed: Feb. 27, 1992

[51] Int. Cl.[5] .............................................. B65G 67/30

[52] U.S. Cl. .................................... 414/422; 280/433; 414/385; 414/582; 414/607

[58] Field of Search ............... 414/422, 425, 385, 391, 414/607, 608, 582, 583, 630–642; 280/433, 438.1

[56] References Cited

U.S. PATENT DOCUMENTS

| | | | |
|---|---|---|---|
| 3,256,042 | 6/1966 | Hunsaker | 280/438.1 X |
| 3,512,670 | 5/1970 | Howard | 414/607 |
| 3,881,619 | 5/1975 | Morris | 414/607 |
| 4,049,146 | 9/1977 | Decker | 414/607 |
| 4,111,452 | 9/1978 | Carlsson | 414/607 X |
| 4,272,220 | 6/1981 | Garcia | 414/607 |
| 4,391,455 | 7/1983 | Fagerstedt | 280/438.1 X |
| 4,723,887 | 2/1988 | Swain | 414/385 |
| 5,090,720 | 2/1992 | Heider et al. | 280/438.1 |

*Primary Examiner*—David A. Bucci
*Attorney, Agent, or Firm*—Ansel M. Schwartz

[57] ABSTRACT

The present invention pertains to an apparatus for lifting a container. The lifting apparatus has an elongate member having a first end and a second end and device for lockingly engaging the elongate member to the container, such as a fifth wheel plate attached to the elongate member which lockingly engages with the container. There is a first end attachment connected in proximity to the first end for connection to a mechanism which lifts the container through the apparatus and a second end attachment connected in proximity to the second end for connection to the mechanism which lifts the container through the apparatus. The invention is also a system for tilting a container. The system includes a fifth wheel plate and device for lifting the fifth wheel plate when it is lockingly engaged with the container. The fifth wheel plate is attached to the lifting device such that as the container is tilted by the lifting device through the fifth wheel plate, the fifth wheel plate remains lockingly engaged with the container. Preferably, the tilting device includes a vehicle, such as a bulldozer.

20 Claims, 5 Drawing Sheets

METHOD AND APPARATUS FOR HANDLING WASTE

FIELD OF THE INVENTION

The present invention is related in general to the unloading of waste from trailers. More particularly, the present invention is related to the tilting of trailers to facilitate unloading of waste in the trailers.

BACKGROUND OF THE INVENTION

Waste is frequently transported to landfills in long trailers or containers by tractors. Manual unloading of the waste packed trailers is known to be a time consuming and labor intensive process. The present invention provides an apparatus and method wherein the trailer is tilted in an expeditious and efficient manner such that the removal of waste from the trailer is facilitated by the influence of gravity. In this manner, unloading time and manpower are substantially reduced.

SUMMARY OF THE INVENTION

The present invention pertains to an apparatus for lifting a trailer or container. The lifting apparatus has an elongate member having a first end and a second end and means for lockingly engaging the elongate member to the container, such as a fifth wheel plate attached to the elongate member which lockingly engages with the container. There is a first end attachment connected in proximity to the first end for connection to a mechanism which lifts the container through the apparatus, and a second end attachment connected in proximity to the second end for connection to the mechanism which lifts the container through the apparatus.

In a preferred embodiment, the first end and second end attachments each include a mounting plate and at least a first ring fixedly attached to the mounting plate through which the elongate member extends. The elongate member is able to rotate with respect to the first ring such that the fifth wheel plate can remain lockingly engaged with the container as the container is lifted by the mechanism. The first and second end attachments each have an end ring fixedly attached to the respective end of the elongate member such that the mounting plate is between the end ring and the fifth wheel plate. The end rings prevent the perspective elongate member end from sliding out of the respective first ring. The first and second end attachments each include a forward stop fixedly attached to the elongate member adjacent the first ring such that the forward stop contacts the mounting plate and prevents the elongate member from further rotation in a first direction. The first and second end attachments each include a backward stop fixedly attached to the elongate member adjacent the first ring such that the backward stop contacts the mounting plate and prevents the elongate member from further rotation in a second direction. Preferably, there is a fifth wheel plate attachment which includes a support board and a plurality of support rings fixedly attached to the elongate member and the support board. Hinge means are provided for hingedly connecting the fifth wheel plate to the support board and there is a fifth wheel level stop attached to the board behind the fifth wheel plate for preventing the fifth wheel plate from pivoting about the hinge more than a predetermined amount.

The invention is also a system for tilting a container. The system includes a fifth wheel plate and means for lifting the fifth wheel plate when it is lockingly engaged with the container. The fifth wheel plate is attached to the lifting means such that as the container is tilted by the lifting means through the fifth wheel plate, the fifth wheel plate remains lockingly engaged with the container. Preferably, the tilting means includes a vehicle, such as a bulldozer.

The present invention also pertains to a method for handling waste. The method comprises the steps of collecting the waste from a first site. The first site can be a location where waste from another location has been brought, it can be an office building, it can be a home, etc. Next, there is the step of bringing the collected waste to a container, for instance, at a transfer station. Next, there is the step of transferring the waste into the container. Then, there is the step of attaching the container to a tractor. Next, there is the step of moving the container with the tractor. Then, there is the step of delivering the container to a landfill site. Next, there is the step of connecting the container to a lifter. Then, there is the step of tilting an end of the container with the lifter such that the container forms an angle with the ground. Then, there is the step of removing the waste in the container. Preferably, after the delivery step, there is the step of releasing the tractor from the container.

BRIEF DESCRIPTION OF THE DRAWINGS

In the accompanying drawings, the preferred embodiment of the invention and preferred methods of practicing the invention are illustrated in which.

FIGS. *4a–4d* are schematic representations showing various side views of the elements of the lifting apparatus.

Figure 5:
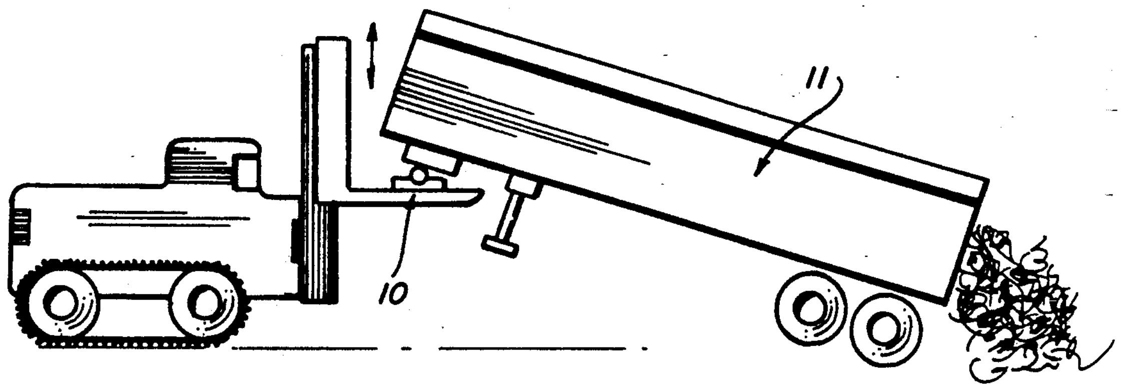

FIG. 5 is a schematic representation showing the lifting apparatus during operation.

DESCRIPTION OF THE PREFERRED EMBODIMENT

Figure 1:
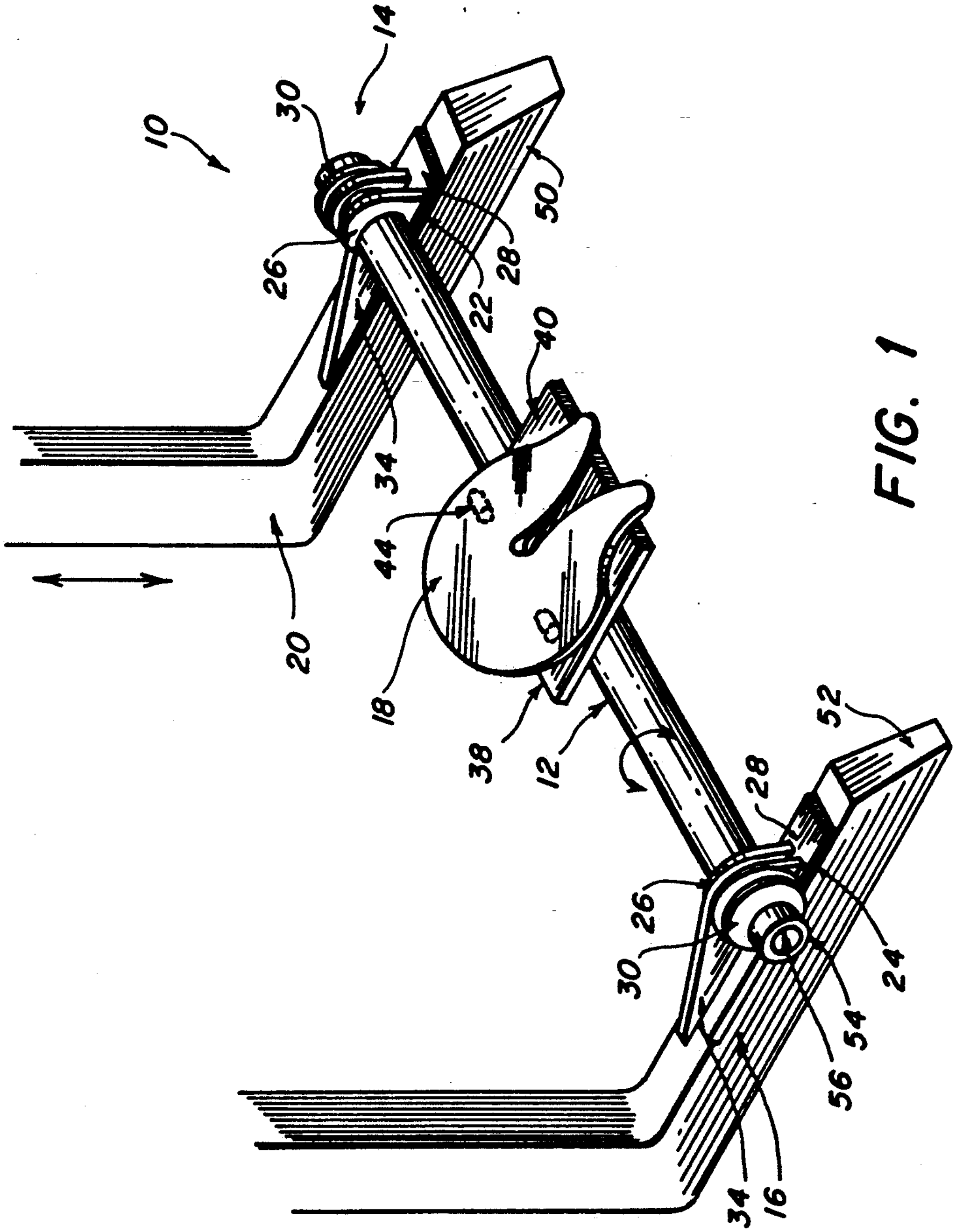
FIG. 1 is a schematic representation of a lifting apparatus.

Referring now to the drawings wherein like reference numerals refer to similar or identical parts throughout the several views, and more specifically to FIG. 1 thereof, there is shown an apparatus 10 for lifting a container 11, such as a trailer. The lifting apparatus 10 has an elongate member 12 having a first end 14 and a second end 16. Between the first end 14 and second end 16 there is means for lockingly engaging the elongate member to the container, such as a fifth wheel plate 18 attached to the elongate member 12. The fifth wheel plate 18 removably engages with a pintel hook of the container which is disposed underneath the front end of a container. The elongate member 12 is attached to lifting means 20, such as a bulldozer, with first and second end attachments 22, 24 or in proximity to the first and second end 14, 16, respectively.

In a preferred embodiment, the first and second end attachments 22, 24 each have a first ring 26 fixedly attached to a mounting plate 28 through which the elongate member 12 extends. The elongate member 12 is able to rotate with respect to the first rings 26 such that the fifth wheel plate 18 can remain lockingly engaged within the pintel hook of the container as the container is tilted by the bulldozer through the apparatus 10. The first and second end attachments 22, 24 each have an end ring 30 fixedly attached to the respective end of the elongate member 12. The end rings 30 prevent the elongate member 12 from shifting laterally with respect to the first rings 26, thereby ensuring that the fifth wheel 18 remains essentially centered and does not slip out of the first rings 26.

Figure 2:
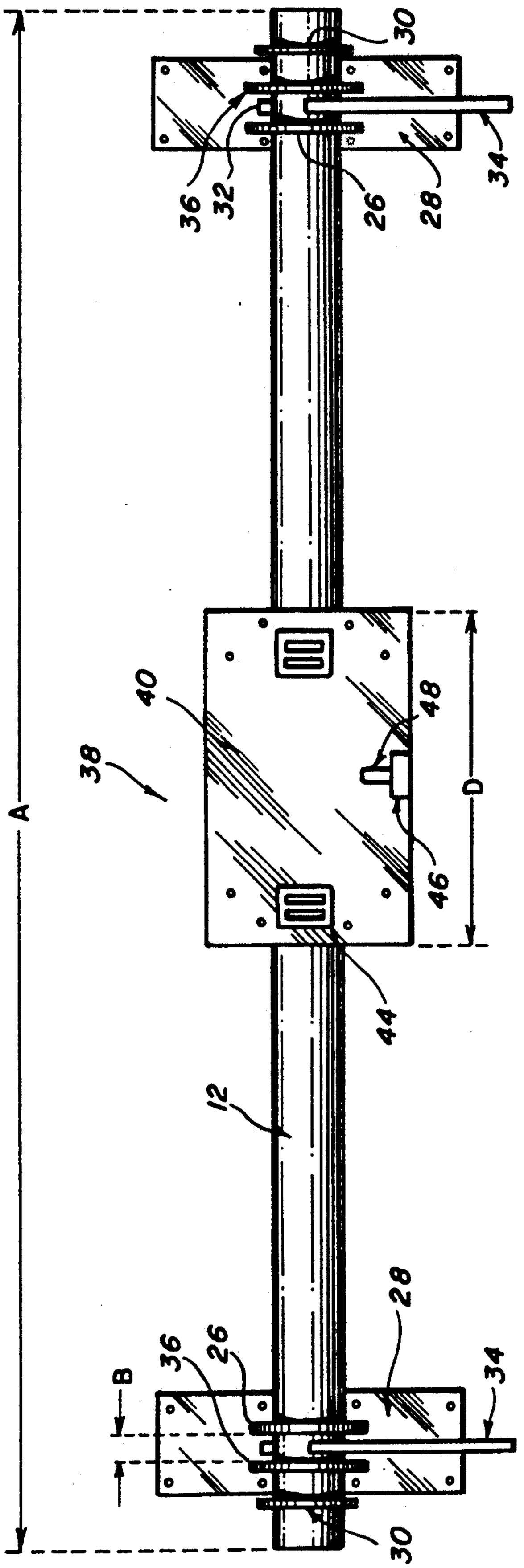
FIG. 2 is a schematic representation showing a top view of the lifting apparatus.
Figure 3:
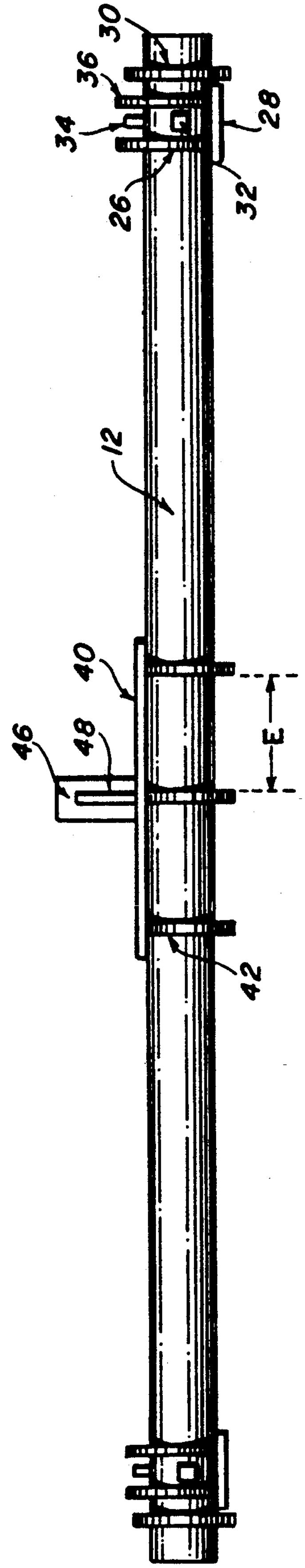
FIG. 3 is a schematic representation showing a front view of the lifting apparatus.

As shown in FIGS. 2 and 3, the first and second end attachments 22, 24 each include a forward stop 32 fixedly attached to the elongate member 12 adjacent to the first ring 26. The forward stop 32 contacts the mounting plate 28 as the elongate member 12 is rotated forward. In this manner, the elongate member 12 is prevented from rotating excessively forward so that the fifth wheel 18 does not need to be repositioned after each use. There can also be a backward stop 34 fixedly attached to the elongate member 12 for preventing the elongate member 12, and thus the fifth wheel 18, from rotating excessively backward after the fifth wheel 18 is lockingly engaged with the container's pintel hook. Also, if the fifth wheel 18 failed to properly engage with the pintel hook, the backward stop 34 stops any more unneeded rotation of the elongate member 12. A second ring 36 can be mounted adjacent and in alignment with the first ring 26 on the mounting plate 28 to further ensure support of the elongate member 12 in the first and second end attachments 22, 24. The forward stop and backward stop 32, 34 are between the first and second ring 26, 36.

The fifth wheel 18 is connected to the elongate member 12 with a fifth wheel plate attachment 38 which preferably includes a support board 40 and a plurality of support rings 42. The support rings 42 wrap about the elongate member 12 and attach to the support board 40. There are also hinge means 44 for connecting the fifth wheel plate 18 to the support board 40 and there is a fifth wheel level stop 46 attached to the support board 40 for preventing the fifth wheel plate 18 from pivoting about the hinge means 44 more than a predetermined amount. Preferably, the fifth wheel level stop 46 prevents the fifth wheel plate 18 from moving past level so the pintel hook can properly seat with the fifth wheel plate 18. The fifth wheel level stop 46 can have a gusset plate 48 for added reinforcement.

The invention is also a system for tilting a container. The system includes a fifth wheel plate 18 and means 20 for lifting the fifth wheel plate 18. The fifth wheel plate 18 is attached to the lifting means 20 such that as the container is lifted, the fifth wheel plate 18 remains lockingly engaged with the container. Preferably, the lifting means 20 is a vehicle, such as a bulldozer. The bulldozer preferably has a first extension 50 and a second extension 52 which extend essentially outward and which the fifth wheel plate 18 is disposed between.

The present invention is also a method for unloading waste from a container, for instance, a trailer with a pintel hook. The method comprises the first step of positioning the container in a desired location. Next, there is the step of engaging with the container with a fifth wheel plate. Then, there is the step of tilting the container through the fifth wheel plate.

Figure 4B:
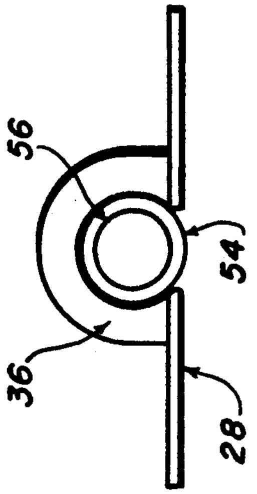
Figure 4D:
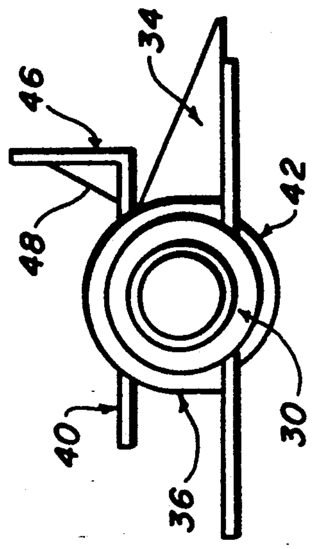
Figure 4A:
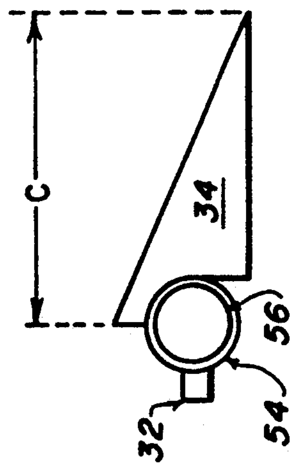
Figure 4C:
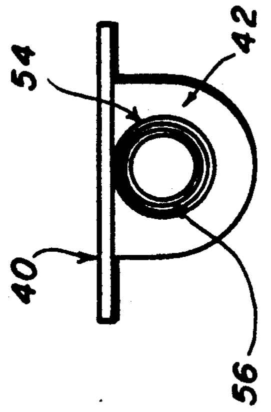

In the preferred embodiment of the invention, the elongate member 12 is comprised of a 16 foot long first steel tube 54 having an 8-inch outer diameter and a ¾ inch thick wall. A second tube 56 is disposed within and welded to first steel tube 54. The second tube 56 is a 6-inch schedule 40 pipe and is also 16 feet long. Reference letter A, shown in FIG. 2, represents the length of the tube. In proximity to the ends of the outer tube 54, end rings 30 are welded. The end rings 30 are ¾ inch plate steel and have a circular perimeter that projects below the mounting plate 28 as shown in FIG. 3. Each mounting plate 28 has two steel plates which are 1 foot, 4 inches long and 10½ inches wide and have a ¾ inch thickness. They are connected in a fixed relationship by the first and second rings 26, 36 which are welded to it. This relationship is shown in FIG. 4*b*. The first and second rings 26, 36 are 4 inches apart as shown by reference letter B in FIG. 2. Welded to the outer tube 54, between the first and second rings 26 and 36, there is the forward stop 32 which is a rectangular steel projection. On the opposite side of the outer tube 54, the backward stop 34 is welded. The backward stop 34 is a triangular ¾ inch steel plate that is 2 feet, 1¼ of an inch long and projects rearwardly. The forward and rearward stops 32 and 34 are shown in relationship to the outer tube 54 in FIG. 4*a*. The length of the rearward stop is represented by reference letter C. FIG. 4*c* shows the support board 40 in relationship to the support rings 42 and the steel tubes 54, 56. FIG. 4*d* shows a complete side view of the apparatus 10. The support board 40 is ¾ inch steel plate and is 3 feet, 5 inches wide as shown by reference D in FIG. 2. There are three support rings 42 spaced 1 foot, 4 inches apart as shown by reference numeral E in FIG. 3.

During the operation of the invention, a trailer filled with waste is transported to a landfill area where it is properly positioned and disconnected from its tractor truck. A bulldozer having the lifting apparatus 10 attached to its forklift attachment positions the fifth wheel plate 18 beneath the trailer's pintel hook. The bulldozer then lifts the fifth wheel plate to contact the pintel hook. Once in contact with the pintel hook, the fifth wheel plate 18 rotates about hinge means 44 until it is flush with the mating surface of the pintel hook. The level stop 46 prevents the fifth wheel plate from overrotating. Once engaged, the bulldozer lifts the fifth wheel plate 18 further to tilt the trailer so that the waste falls from the other end of the container under the influence of gravity. The trailer is tilted until at its highest end it is 22 feet off the ground and has formed a 24° angle therewith. As the trailer is lifted, the tubes 54, 56 rotate about the rings 26 and 36 so that the fifth wheel plate remains engaged and flush with the pintel hook throughout the tilting process, as shown in FIG. 5. The backward stop 34 prevents the tubes 54, 56 from overrotating backwards. Once emptied, the trailer is then lowered with the bulldozer back down to the ground. The fifth wheel stop 18 is then disengaged from the pintel hook. The forward stop 32 prevents the tubes 54, 56 from rotating forward by the weight of the fifth wheel plate 18. In this manner, the trailers loaded with waste can be unloaded in a matter of a few minutes with minimal manpower. A full trailer, it was found, could be unloaded in 3 minutes and 30 seconds with the use of the apparatus 10. This compared with 45 minutes to unload the trailer without the use of the apparatus 10.

The present invention also pertains to a method for handling waste. The method comprises the steps of collecting the waste from a first site. The first site can be a location where waste from another location has been brought, it can be an office building, it can be a home, etc. Next, there is the step of bringing the collected waste to a container, for instance, at a transfer station. Next, there is the step of transferring the waste into the container. Then, there is the step of attaching the container to a tractor. Next, there is the step of moving the container with the tractor. Then, there is the step of delivering the container to a landfill site. Next, there is the step of connecting the container to a lifter. Then, there is the step of tilting an end of the container with the lifter such that the container forms an angle with the ground. Then, there is the step of removing the waste in the container. Preferably, after the delivery step, there is the step of releasing the tractor from the container.

Alternatively, after the moving step, there can be the step of depositing the container onto a railroad car. Then, there is the step of moving the container with the railroad car. The railroad car could bring the container to a landfill site where the container is subsequently connected to a lifter. Or, the railroad car can bring the container to another site where the container is removed from the railroad car and then there is the step of connecting the container to another tractor which moves the container to the landfill site.

Preferably, the step of attaching the container to the tractor includes the step of connecting the tractor to a fifth wheel on the container. Moreover, the step of releasing the tractor from the container includes the step of releasing the tractor from the fifth wheel of the container. Similarly, the step of connecting the container to the lifter includes the step of connecting the lifter to the fifth wheel of the container.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A connection apparatus for a container which allows the container to be tilted comprising:
   - an elongate member having a first end and a second end;
   - means for lockingly engaging the elongate member with the container, said engaging means attached to the elongate member, said engaging means having hinge means for allowing the engaging means to pivot for proper engagement with the container;
   - a first end attachment connected in proximity to the first end for connection to a mechanism which lifts the container such that the elongate member can rotate as the container is tilted; and
   - a second end attachment connected in proximity to the second end for connection to the mechanism which lifts the container such that the elongate member can rotate as the container is tilted.

2. An apparatus as described in claim 1 wherein the engaging means is a fifth wheel plate attached to the elongate member which lockingly engages with the container.

3. An apparatus as described in claim 2 wherein the first end and second end attachments each include a mounting plate and a first ring fixedly attached to the mounting plate through which the elongate member extends, said elongate member able to rotate with respect to the first ring such that the fifth wheel plate can remain lockingly engaged with the container as the container is lifted by the mechanism.

4. An apparatus as described in claim 3 wherein the first and second end attachments each have an end ring fixedly attached to the respective end of the elongate member such that the mounting plate is between the end ring and the fifth wheel plate, said end ring preventing the respective elongate member end from sliding out of the respective first ring.

5. An apparatus as described in claim 4 wherein the elongate member at each end includes a forward stop fixedly attached to the elongate member adjacent the first ring such that the forward stop contacts the mounting plate and prevents the elongate member from further rotation in a first direction when the fifth wheel plate is disengaged from the container so the fifth wheel plate does not have to be repositioned to engage a container.

6. An apparatus as described in claim 5 wherein the elongate member at each end includes a backward stop fixedly attached to the elongate member adjacent the first ring such that the backward stop contacts the mounting plate and prevents the elongate member from further rotation in a second direction.

7. An apparatus as described in claim 6 wherein the first and second end attachments each have a second ring fixedly attached to the mounting plate through which the elongate member extends, said second ring in alignment with said first ring and disposed such that the forward stop and the backward stop are between the first and second rings, and the second ring is between the fifth wheel plate and the first ring, said elongate member able to rotate with respect to the second ring such that the fifth wheel plate can remain lockingly engaged with the container as the container is lifted.

8. An apparatus as described in claim 7 including a fifth wheel plate attachment for attaching the fifth wheel plate to the elongate member.

9. An apparatus as described in claim 8 wherein the fifth wheel plate attachment includes a support board; a plurality of support board rings fixedly attached to the elongate member and the support board for fixedly attaching the support board to the elongate member;
   - hinge means for hingedly connecting the fifth wheel plate to the support board; and a fifth wheel level stop attached to the board and behind the fifth wheel plate for preventing the fifth wheel plate from pivoting about the hinge more than a predetermined amount.

10. A system for tilting a container comprising: a fifth wheel plate; and means for lifting the fifth wheel plate when it is lockingly engaged with the container, said fifth wheel plate attached to the lifting means such that as the container is tilted through an angle of at least 24° by the lifting means through the fifth wheel plate, the fifth wheel plate remains lockingly engaged with the container.

11. A system as described in claim 9 wherein the tilting means includes a vehicle.

12. A system as described in claim 10 wherein the vehicle has a first extension and second extension which extend essentially outward; said fifth wheel plate attached to the vehicle between the first and second extensions.

13. A system as described in claim 11 wherein the vehicle is a bulldozer.

14. A system as described in claim 12 wherein the lifting means includes an elongate member having a first end and a second end, said fifth wheel plate attached to the elongate member;
   - a first end attachment connected to the first end for connection to a bulldozer along its first extension which lifts the container; and a second end attachment connected to the second end for connection to the bulldozer along its second extension which lifts the container through the apparatus.

15. A connection apparatus for a container which allows the container to be tilted comprising:

an elongate member having a first end and a second end;

means for lockingly engaging the elongate member with the container, said engaging means attached to the elongate member, said engaging means is a fifth wheel plate attached to the elongate member which lockingly engages with the container;

a first end attachment connected in proximity to the first end for connection to a mechanism which lifts the container; and a second end attachment connected in proximity to the second end for connection to the mechanism which lifts the container, said first end and second end attachments each include a mounting plate and a first ring fixedly attached to the mounting plate through which the elongate member extends, said elongate member able to rotate with respect to the first ring such that the fifth wheel plate can remain lockingly engaged with the container as the container is lifted by the mechanism, said first and second end attachments each have an end ring fixedly attached to the respective end of the elongate member such that the mounting plate is between the end ring and the fifth wheel plate, said end ring preventing the respective elongate member end from sliding out of the respective first ring.

16. An apparatus as described in claim 15 wherein the elongate member at each end includes a forward stop fixedly attached to the elongate member adjacent the first ring such that the forward stop contacts the mounting plate and prevents the elongate member from further rotation in a first direction when the fifth wheel plate is disengaged from the container so the fifth wheel plate does not have to be repositioned to engage a container.

17. An apparatus as described in claim 16 wherein the elongate member at each end includes a backward stop fixedly attached to the elongate member adjacent the first ring such that the backward stop contacts the mounting plate and prevents the elongate member from further rotation in a second direction.

18. An apparatus as described in claim 17 wherein the first and second end attachments each have a second ring fixedly attached to the mounting plate through which the elongate member extends, said second ring in alignment with said first ring and disposed such that the forward stop and the backward stop are between the first and second rings, and the second ring is between the fifth wheel plate and the first ring, said elongate member able to rotate with respect to the second ring such that the fifth wheel plate can remain lockingly engaged with the container as the container is lifted.

19. An apparatus as described in claim 18 including a fifth wheel plate attachment for attaching the fifth wheel plate to the elongate member.

20. An apparatus as described in claim 19 wherein the fifth wheel plate attachment includes a support board; a plurality of support board rings fixedly attached to the elongate member and the support board for fixedly attaching the support board to the elongate member.

* * * * *